Figure 1:
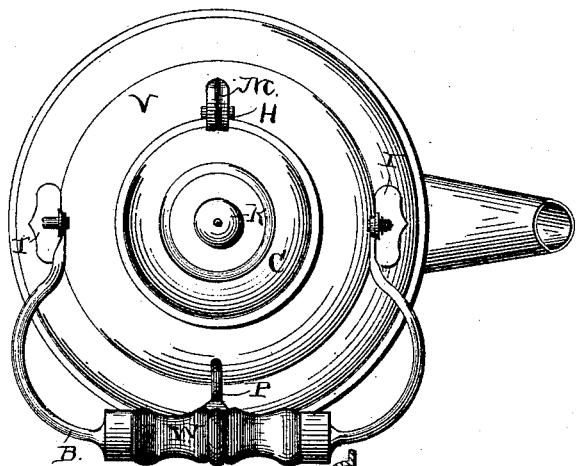

(No Model.)

J. BARTLETT & J. NABER, Jr.
SWINGING COVER.

No. 451,447. Patented May 5, 1891.

Witnesses
H. J. Seitz
N. L. Collamer

Inventors
Jeremy Bartlett
Joseph Naber, Jr.
By their Attorneys,
C. A. Snow & Co.

UNITED STATES PATENT OFFICE.

JEREMY BARTLETT AND JOSEPH NABER, JR., OF COLLINS, NEW YORK.

SWINGING COVER.

SPECIFICATION forming part of Letters Patent No. 451,447, dated May 5, 1891.

Application filed September 25, 1890. Serial No. 366,120. (No model.)

*To all whom it may concern:*

Be it known that we, JEREMY BARTLETT and JOSEPH NABER, Jr., citizens of the United States, residing at Collins, in the county of Erie and State of New York, have invented a new and useful Swinging Cover, of which the following is a specification.

This invention relates to closures for metallic packing and storing vessels, and more especially to that class of such closures known as "swing-cover;" and the object of the same is to produce a cover hinged at one side to the body of a kettle, pail, or other vessel and adapted to be automatically opened when the handle of such vessel is turned to one side, as well as to be held open at any desired angle.

To this end the invention consists of the construction and combination of parts hereinafter more fully described and claimed, and as illustrated in the drawings, in which—

Figure 2:
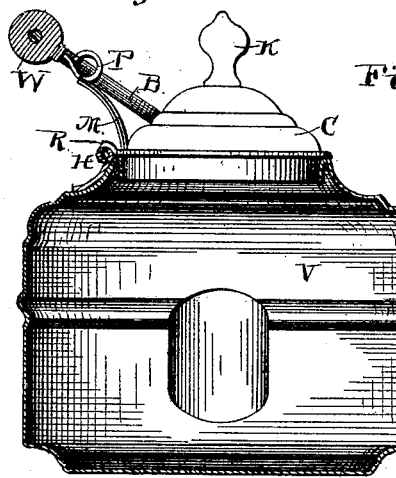
Figure 3:
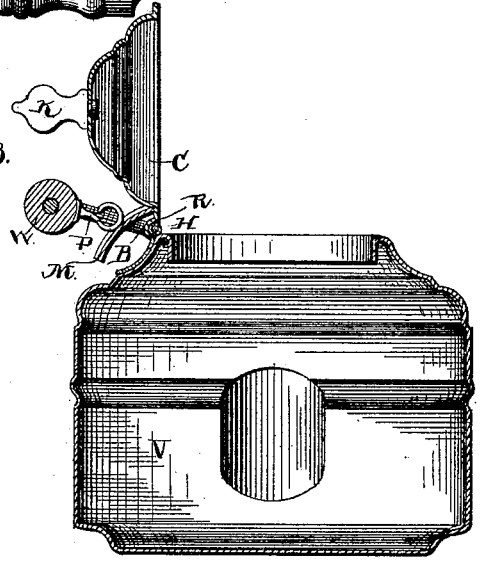
Figure 4:
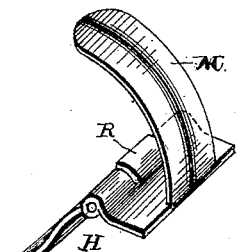

Figure 1 is a plan view of our improved cover, showing it closed upon the body of a vessel. Fig. 2 is a cross-section of the vessel, showing the cover as closed. Fig. 3 is a central cross-section of the cover and its hinge, showing said cover held completely open and also showing a section of the vessel and handle. Fig. 4 is an enlarged perspective detail of the hinge of the cover.

Referring to the said drawings, the letter V designates a kettle, pail, or other vessel and of any suitable material, preferably metal, to eyes I on the upper side of which is hinged the usual bail B, having a wooden handle W.

The letter C designates our improved cover, which is connected by a hinge H to the body of the vessel at one side of the top thereof or midway between the eyes I, and this cover has a wooden knob K rising from its center, all of the ordinary and well-known construction.

Coming now to the present invention, the handle W has a downwardly-extending projection P at its center, and the cover has an outwardly-curving cam M standing in the path of said projection when the handle is turned upon its pivots. The curvature of the cam is such that when the handle is turned down to that side and the projection P rests on the cam the cover will be held partly open at any position to which it is set. The hinge H (best seen in Fig. 4) comprises a single eye on the body V and two eyes on the cover, between which latter is a rest R moving over the single eye of the body and striking the body of that leaf of the hinge when the cover is opened completely, as seen in Fig. 3.

In use the handle may be turned to the position shown in Fig. 3 and the vessel filled with water, after which the handle is turned to the position shown in Fig. 1 and the vessel is closed. During all these operations or any other use of the device the operator's hand comes in contact only with the wooden handle W, and the projection P causes the cam M to stand so remote from said handle that the operator's fingers will not come in contact therewith and be burned. If the water is boiled, the handle is turned over, so that the projection P rests upon the tip of the cam M when the cover is still closed, and should steam be generated within the vessel to an extent that the pressure becomes sufficient to open the cover the weight of the handle will cause it to stand open at the point to which the steam forced it; or if the pivots of the bail B have considerable friction in the eyes I it will stand erect, or in any position to which it is turned, and the movements of the cover will not cause corresponding movements of the bail. In any case when the vessel is lifted by its handle, or when the handle stands over the knob, the cover can open only for a slight distance sufficient to permit a limited escape of steam, if there be steam in the vessel, but insufficient to permit the escaping steam to burn the hand of the person holding the vessel.

What is claimed as new is—

1. The combination, with a vessel, a cover hinged at one side thereto, and a cam rising from said cover near its hinge, of a bail pivoted in eyes at the front and rear of the vessel and having a wooden handle, and a projection depending from said handle and adapted to engage said cam, the whole operating as set forth.

2. The combination, with vessel V, the cover C, connected thereto at one side by a hinge H, said hinge having a rest R upon one leaf adapted to strike the other leaf to support the cover when open, and a cam M, rising from the cover above said hinge, of a bail B, pivoted in eyes I at the front and rear of the vessel and having a wooden handle W, adapted to engage said cam, the whole operating as set forth.

3. The combination, with the vessel V, the cover C, connected thereto at one side by a hinge H, said hinge having a rest R upon its upper leaf adapted to strike the body of the other leaf to support the cover when open, and an outwardly-curving cam M on the cover above said hinge, of a bail B, pivoted in eyes I in the front and rear of the vessel, a wooden handle W upon said bail, and a downwardly-extending projection P at the center of said handle adapted to engage said cam, the whole operating as hereinbefore set forth.

In testimony that we claim the foregoing as our own we have hereto affixed our signatures in presence of two witnesses.

JEREMY BARTLETT.
JOSEPH NABER, Jr.

Witnesses:
MICHAEL MOLL,
OWEN L. MOSS.